United States Patent
Tamposi et al.

(10) Patent No.: US 8,385,973 B1
(45) Date of Patent: Feb. 26, 2013

(54) REMOTE EQUIPMENT CONTROL SYSTEM

(76) Inventors: Peter Tamposi, Nashua, NH (US);
Frank Thibodeau, Canaan, NH (US);
Michael U. Bosowski, Amherst, NH (US)

( * ) Notice: Subject to any disclaimer, the term of this patent is extended or adjusted under 35 U.S.C. 154(b) by 0 days.

(21) Appl. No.: 13/241,713

(22) Filed: Sep. 23, 2011

(51) Int. Cl.
*H04M 1/00* (2006.01)

(52) U.S. Cl. ............ 455/556.1; 455/418; 455/419; 455/409; 455/557; 379/8; 379/10.02; 379/21; 379/22.02; 379/29.06; 379/29.11

(58) Field of Classification Search ........... 455/556.1, 455/418, 419, 409, 557; 379/8, 10.02, 21, 379/22.02, 29.06, 29.11
See application file for complete search history.

(56) References Cited

U.S. PATENT DOCUMENTS

| | | | |
|---|---|---|---|
| 5,276,728 A | 1/1994 | Pagliaroli et al. | |
| 5,802,420 A | 9/1998 | Garr et al. | |
| 6,489,897 B2 | 12/2002 | Simon | |
| 6,664,888 B1 | 12/2003 | Bishop | |
| 6,717,527 B2 | 4/2004 | Simon | |
| 7,053,831 B2 | 5/2006 | Dempsey et al. | |
| 7,061,137 B2 | 6/2006 | Flick | |
| 7,099,895 B2 | 8/2006 | Dempsey | |
| 7,312,886 B2 | 12/2007 | Gomi | |
| 7,359,773 B2 | 4/2008 | Simon et al. | |
| 7,430,471 B2 | 9/2008 | Simon | |
| 7,443,300 B2 | 10/2008 | Tessier | |
| 7,450,259 B2 | 11/2008 | Gassho et al. | |
| 8,023,129 B2 | 9/2011 | Kawai et al. | |
| 2001/0019953 A1* | 9/2001 | Furukawa et al. | 455/420 |
| 2003/0115326 A1 | 6/2003 | Verma et al. | |
| 2004/0054583 A1 | 3/2004 | Nye et al. | |
| 2004/0118915 A1* | 6/2004 | Daniel et al. | 235/382.5 |
| 2004/0158661 A1 | 8/2004 | Mokuya | |
| 2007/0225037 A1* | 9/2007 | Koike | 455/556.1 |
| 2008/0004075 A1* | 1/2008 | Horton | 455/557 |
| 2008/0221743 A1 | 9/2008 | Schwarz | |
| 2009/0054050 A1* | 2/2009 | Almeda et al. | 455/419 |
| 2009/0147299 A1 | 6/2009 | Tetu | |
| 2009/0184823 A1 | 7/2009 | Tessier | |
| 2009/0198734 A1 | 8/2009 | Tessier | |
| 2011/0086611 A1* | 4/2011 | Klein et al. | 455/407 |
| 2011/0167274 A1* | 7/2011 | Swamidas et al. | 713/176 |

FOREIGN PATENT DOCUMENTS

EP 0875747 11/1998

* cited by examiner

*Primary Examiner* — Kwasi Karikari

(57) ABSTRACT

A system for remote control of equipment such as office equipment is provided. The system involving a telephone interface and a control system. A method is provided for remote equipment control having steps of installing and configuring equipment. A method is provided controlling equipment remotely having steps relating to using elements of a control system.

9 Claims, 4 Drawing Sheets

REMOTE EQUIPMENT CONTROL SYSTEM

BACKGROUND OF THE INVENTION

1. Field of the Invention

The present invention relates generally to equipment management systems. More particularly, the present invention relates to a telephone-based remote equipment management system.

2. Description of Related Art

Often, equipment is leased, rented or sold subject to a purchase money security interest (PMSI) to users who cannot afford or do not want to buy the equipment outright, or who have only temporary need for it. Often this equipment is provided in return for periodic payments that may be fixed, or based on use. However, when a lessee is in possession of the equipment, it can sometimes be costly, difficult or impossible to control and enforce prompt payment. Moreover, because of logistical issues, once a lessee is in possession of the equipment, there is little incentive to pay periodically or to return it. The legal remedies to enforce payment obligations are inconsistent among the states and pursuing such remedies can be extremely costly. A lessee's or owner's obligation to make such periodic payments can also be delayed or severely reduced in amount by a bankruptcy of the lessee or owner of the equipment. Finally, for the lessor, there is often a need to perform periodic maintenance, upgrades, and the like to the equipment. Much of this work can be performed if given access to the electronic components of the equipment. However collecting the data necessary to maintain or upgrade equipment can be impossible or prohibitively expensive.

Therefore, what is needed is a system that allows convenient remote access control to controlled equipment via a cellular telephone based interface, to control the equipment, including but not limited to disabling it upon the event of a payment default, without physically accessing it.

SUMMARY OF THE INVENTION

The subject matter of this application may involve, in some cases, interrelated products, alternative solutions to a particular problem, and/or a plurality of different uses of a single system or article.

In one aspect, a remote equipment management system is provided. The system comprising a telephone capable of providing a signal to a control system via a telephone interface, the control system comprising a signal receiver and a microprocessor, the signal receiver configured to receive the signal from the telephone interface, and being in electronic communication with the microprocessor, the microprocessor being interfaced with an electronics system of a controlled equipment, the microprocessor constructed and configured to provide an output signal to the controlled equipment, and wherein the output signal provided from the microprocessor to the controlled equipment results in an action by the controlled equipment.

In another aspect, a method of remote equipment control is provided. The method comprises the steps of installing a control system on a controlled equipment, configuring a tone detector chip of the control system to process a touch tone provided by a telephone in communication with the control system, installing a signal receiver in electronic communication with the tone detector chip, the signal receiver capable of receiving the touch tone from the telephone, communicating the tone received by the tone detector chip, as a signal, to a microprocessor of the control system, configuring the microprocessor to receive the signal sent to it by the tone detector chip, processing, by the microprocessor, the signal sent by the tone detector chip, and configuring the microprocessor to provide a signal to the controlled equipment whereby the controlled equipment performs an action based on the signal provided.

In yet another aspect, a method of controlling equipment remotely is provided. The method comprises the steps of providing an item of controlled equipment capable of remote control, utilizing a telephone to access a control system of a controlled equipment, determining an appropriate tone code, inputting the tone code using a key pad of the telephone, and receiving a feedback message on the telephone provided by a signal transmitter of the control system.

DETAILED DESCRIPTION

Figure 1:
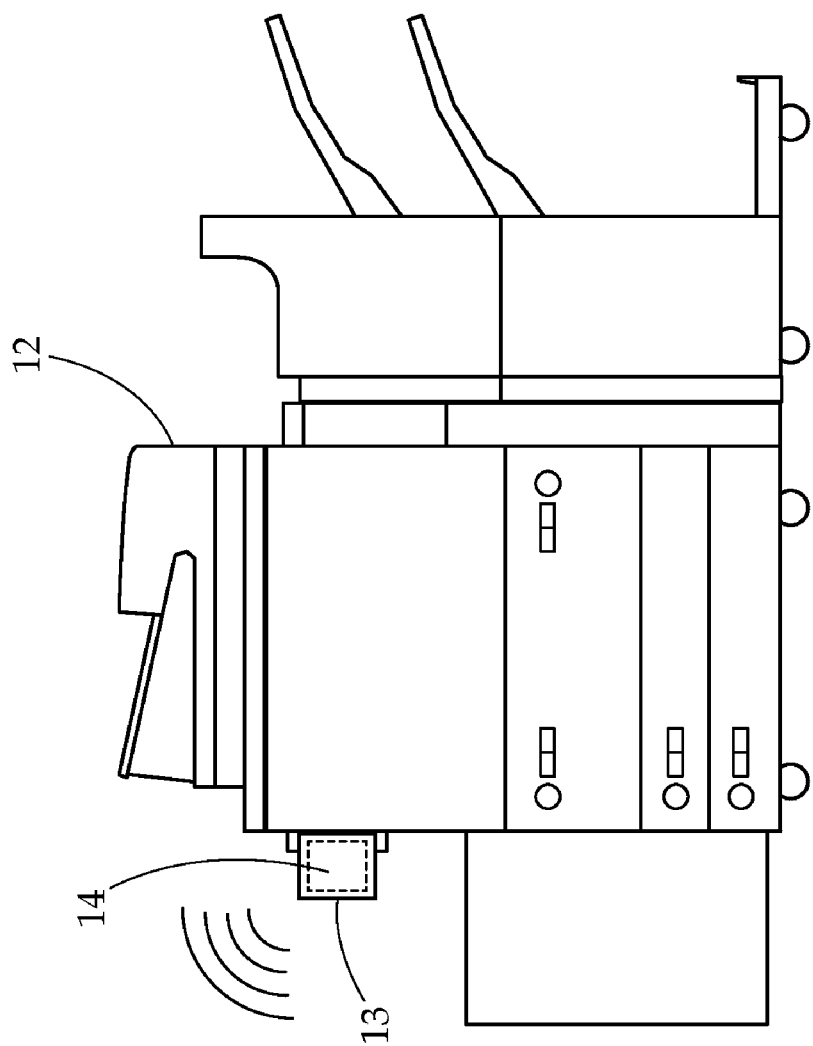
FIG. 1 provides a view of the remote equipment management system.
Figure 1:
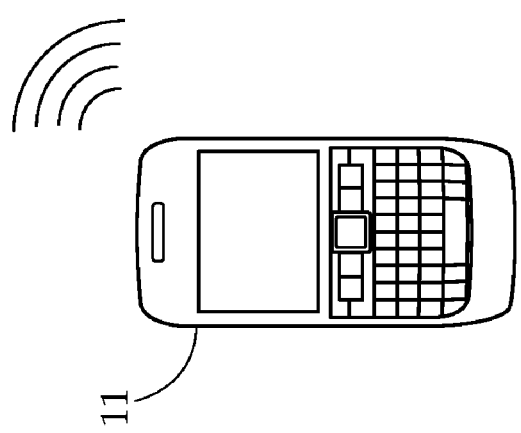

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a remote equipment management system. The system may comprise a telephone interface, and a control system which comprises a signal receiver capable of communication with the telephone interface, a microprocessor interfaced with the signal receiver, and a controlled equipment in communication with the microprocessor.

The telephone interface may be a device that allows a user to utilize a telephone to remotely communicate with the control system, which is in electronic communication with the controlled equipment. The telephone interface may be in the form of any telephonic device. Examples of the telephone interface may include a cellular telephone, a hard-wired telephone line, a computerized telephone, or an internet-enabled smart-phone program. Such communication may also be performed directly over the Internet. Generally, existing telephone hardware and/or software may operate as the telephone interface without any modification. This may allow a lessor or owner to access their equipment using an existing telephone with little to no modification of their telephones.

The control system may be physically mounted to the controlled equipment. In one embodiment, the control system may be integrated within the device. In another embodiment, the control system may be mounted to an outside of the device.

The control system may have a signal receiver which may be any device that may receive and process a signal sent from the telephone interface. For example the signal receiver may be a cellular telephone or other radio receiver, a device configured to receive and interpret tones sent through a traditional phone line or Ethernet cable, a device configured to receive signals from the internet, and the like. In one embodiment, the signal receiver may be a mobile cellular device, meaning any device capable of receiving a signal using a cellular telephone network.

The signal receiver may be configured to receive signals from the telephone interface, process them, and send the processed signals to a microprocessor. In one embodiment, the signal receiver may receive signals in the form of tones sent by a touch-tone telephone interface.

The signal receiver may be accessed and logged-into so as to receive signals from the telephone interface in a variety of manners. In one embodiment, the telephone interface may have a mobile phone application that allows direct login access to the signal receiver. In another embodiment the signal receiver may have a unique dedicated phone number. In still another embodiment, the signal receiver may be accessed by an extension number through a phone directory.

The signal receiver may have security features to enhance operability. In one embodiment, the signal receiver may have a caller identification feature such that it may only receive signals from an authorized user. In another embodiment, the deactivation of the controlled equipment may be limited to times where the device is idle. For example, a copy machine could be damaged if power was cut during a copying operation.

In one embodiment, the control system may further have a return communication feature in the form of a transmitter or a transceiver. The control system thus equipped may be capable of providing feedback to the telephone interface in the form of a message. One embodiment of a message may be, in the event of a bad connection between the telephone interface and the signal receiver, an error message to inform the user of the telephone interface that a poor connection exists. In another embodiment, the signal transmitter could be configured to provide status indicator messages relating to the status of the controlled equipment, confirmation codes confirming receipt of commands, and the like. Other embodiments of messages may include a message that indicates that a keystroke has been detected, a message that indicates that a code was received, and a message if the code was correct or incorrect.

In a further embodiment, the signal transmitter may transmit status messages relating to information about the controlled equipment. Information about the controlled equipment may include data such as error codes in the event that the controlled equipment is malfunctioning, fluid levels, impressions made, toner level, miles, hours of use, and generally any items of interest to a user of the control system.

In this embodiment, the control system may be utilized to control a wide variety of aspects of an item of controlled equipment. For example, the control system may be integrated to access and control features of the controlled equipment including, but not limited to number of copies, page usage, toner levels, hours of usage, data transmission limits, and the like. As in other embodiments, a telephone interface may access the control system through the signal receiver or transceiver, and remotely control aspects of the controlled equipment.

The control system may further have a microprocessor that may be in electronic communication with the signal receiver. The microprocessor may be configured to receive a signal from the signal receiver, process the signal, and provide an output signal that is sent to the controlled equipment. The output from the microprocessor may be a command to the controlled equipment to take some action.

The microprocessor may be any type of microprocessor that may receive an input signal from the signal receiver, and provide an output signal to a controlled equipment. The output signal in turn may perform, or cause an action on the controlled equipment based on the signal provided such as connecting or disconnecting the power supply to the device. In one embodiment a PIC processor may be used.

The microprocessor may control a number of features of the controlled equipment. The features controlled may vary depending on the type of device, although controlling power and the ability for the device to power on and off may be a key controlled element universal to the controlled equipment. In one embodiment, an alternating current (AC) relay may be installed in a power system of the controlled equipment. In this embodiment, the microprocessor is electronically connected to the AC relay. The microprocessor may deactivate the controlled equipment by using the AC relay to disconnect the power to the controlled equipment. To reactivate the device, the microprocessor may use the AC relay to re-connect the power to the controlled equipment. In another embodiment, using a copy machine as an example of a controlled equipment, the control system may control: power to the device, the amount of copies that may be made, different features that may be accessed such as a scanning mode, email mode, types of paper that may be used, and the like.

The controlled equipment may be any device or equipment that may be leased or subject to a PMSI. In one embodiment, the controlled equipment is an item of office equipment. Items of office equipment include but are not limited to copy machines, printers, personal computers, mainframe computers, servers, scanners, fax machines, and the like. In other embodiments, the controlled equipment may generally be any device that is electronically operated or powered, the control system operating to shut on and off the electronic power. Such controlled equipment may include medical equipment, industrial equipment, cars, ships and the like. Alternate embodiments may be particularly useful to enforce leases on cars as well as driving restrictions such as speed or time-of-operation restrictions. Further embodiments of the control system may include mechanical actuators to further control mechanical features of a controlled equipment. For example, a mechanical actuator could be utilized to lock the breaks on wheeled devices, or a mechanical actuator could operate a valve to limit fluid flow such as a fuel supply.

The control system may further comprise a tone detector in communication with the signal receiver and microprocessor. The tone detector chip may be configured to recognize specific tone based codes received from the signal receiver and sent from a touch tone telephone interface. The tone-based codes may be processed by the tone detector, sent as an input to the microprocessor, and sent as an output from the microprocessor to cause the controlled equipment to perform a certain action.

In one embodiment, the tone detector may be a chip in the form of a common off-the-shelf internal component available at many electronic component distributors. The tone detector chip is used to detect when a given key has been input by the user of the touch tone telephone interface. When the tone detector receives a tone which is part of the normal keypad strokes (numbers 0-9, * and #) it activates a number of connection lines to the microprocessor which tell the microprocessor which of the touch tone telephone interface keys it has detected. The tone detector may also activate a clock line, communicating to the microprocessor that a tone has been detected. By using the data lines and the clock line, the microprocessor can determine which touch tone telephone interface key has been pressed on the touch tone telephone interface, and in what order. In one embodiment, the tone detector and microprocessor may continually monitor these data lines and the clock line until the system detects a set of keypad strokes which will trigger an action on the controlled equipment. In another embodiment, the tone detector and microprocessor may be periodically active, to save electricity.

In one embodiment, the tone codes capable of creating specific actions may be pre-set and permanent. In another embodiment, the tone codes may be customizable based on user preferences.

The control system may further comprise a case that may encompass all elements of the system excepting the telephone interface. The case may be configured to contain the signal receiver, microprocessor and other electronic components, and may have a power input to provide electrical power to the control system. The case may form an aperture allowing the passage of a cable or wire. Further the case may have output wires that may be connected to the controlled equipment, and that may communicate an output of the microprocessor to the controlled equipment. The case may include an attachment mechanism on an outer surface that may facilitate the attachment of the control system to a standard device that is intended to be controlled. In one embodiment, the attachment mechanism may involve screw fittings. In another embodiment, the attachment mechanism may be Velcro®. In yet another embodiment, the attachment mechanism may be an adhesive. In still another embodiment, the attachment mechanism may be snapped on to the controlled equipment.

In operation, the control system may allow a user to communicate with the signal receiver via the telephone interface, such as a land-line telephone, an Internet connection, a cellular telephone, or another device that transmits signals via radio waves, among other things. The control system may acknowledge receipt of the communication by sending a signal via a signal transmitter in the form of a message to the telephone interface, such as an automated voice message, response tones, or a text message, among other things. The signal receiver may then await a code entry from the user. For every portion of the code entry received by the signal receiver, the signal transmitter communicates with the telephone interface to acknowledge the receipt of that portion of the code entry. If no acknowledgement is sent from the signal transmitter to the telephone interface, then the user knows that the user must input that code portion again. The signal transmitter may send an acknowledgement to the telephone interface upon entering a correct code, informing the user as to whether they successfully activated or deactivated the control system. Furthermore, if the user enters the wrong code, the signal transmitter will send a communication to the telephone interface acknowledging as much. In one embodiment, assume the code is in the form of characters that can be input from a typical 12-button telephone keypad (numbers 0-9 and the * and # characters). Further, in this embodiment, the activation code for the control system consists of the three-digit code 245 and the deactivation code for the control system consists of the three-digit code 598. If the signal receiver receives a code entry of 234, then the signal transmitter would send an acknowledgement back to the telephone interface that the received code is invalid and would re-prompt the user to enter a valid code. This process would repeat until a valid code is entered. The signal transmitter would acknowledge the successful code entry as mentioned above, then disconnect from the telephone interface.

In one embodiment of operation, the telephone interface may be utilized to control certain aspects of the controlled equipment. A user may utilize a telephone as a telephone interface to communicate with the control system. The signal receiver of the control system may receive input signals in the form of tones from the telephone interface. The tones may be sent to a tone detector chip which interprets and processes the tones and send them, as a signal to the microprocessor. The microprocessor, being configured to control various features of the controlled equipment, may, upon the input of the appropriate code, provide an output signal to the controlled equipment to act on one of the controlled features.

In another embodiment of operation, the telephone interface may be manually operated by a user. In this embodiment, the a user may manually operate the telephone interface by using a telephone, either cellular or wired, to access the control system and input codes depending on how the controlled equipment is intended to be manipulated. In this embodiment, a user may use a telephone interface to remotely access the control system. Remote access may allow the user to check the status of a controlled equipment, to troubleshoot the controlled equipment, or to adjust controlled parameters of the controlled equipment, such as shutting off power in the event that a bill is unpaid.

In another embodiment of operation, the telephone interface may be automatically operated and manipulated by a computerized system. In this embodiment, a computer may be configured to utilize the telephone interface to access the control system and automatically input codes depending on how the controlled equipment is intended to be manipulated. For example, in one embodiment, a computer may track the status of bill payments. In the event that a bill is overdue by a given amount of time, the computer may automatically utilize the telephone interface to access the control system of the controlled equipment, and use the control system to deactivate the controlled equipment. Once payment has been received, the computer may again utilize the telephone interface to access the control system of the controlled equipment, and use the control system to activate the controlled equipment.

In still another embodiment, the telephone interface may be integrated into the internet, and a computer may be configured to directly access the controlled equipment over the internet.

Turning now to FIG. 1 a view of the remote equipment management system is provided. A cellular telephone 11 is shown as a telephone interface. The cellular telephone 11 communicates with the control system 14. The control system 14 is shown in FIG. 1 as being disposed within a case 13 and mounted to a copy machine 12, and in electronic communication with the copy machine (not shown). The copy machine 12 is shown in FIG. 1 as an example of the controlled equipment of the present invention.

Figure 2:
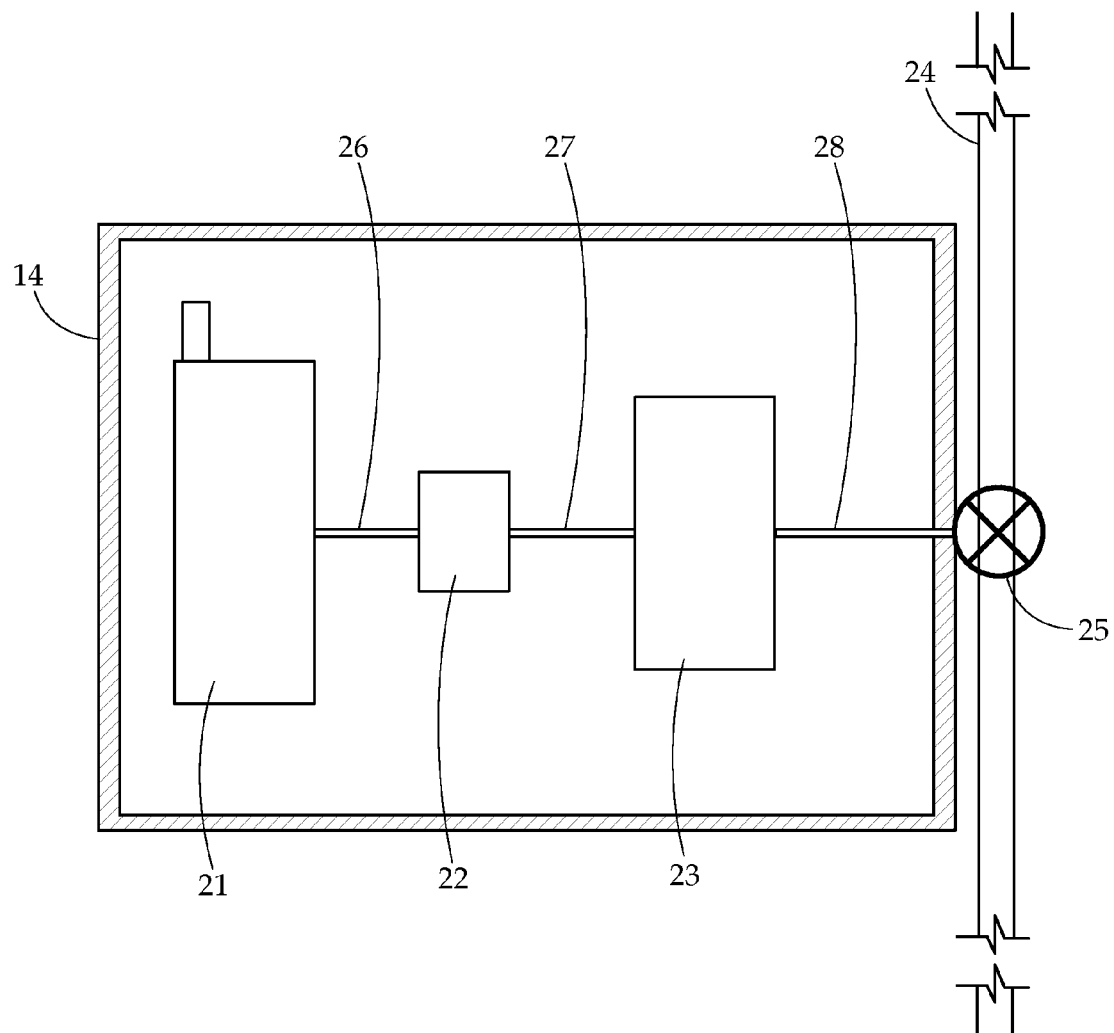
FIG. 2 provides a detail view of one embodiment the control system.

FIG. 2 shows a detail view of one embodiment the control system 14. A signal receiver 21 is configured to wirelessly receive signals in the form of tones from the telephone interface (not shown). The signal receiver 21 sends a received signal through wire 26, to a tone detector chip 22. The tone detector chip 22 processes the tone signal received by the signal receiver 21, and then sends the processed tone signal through wire 27 to a microprocessor 23. The microprocessor 23 interprets the inputted signal, and depending on the signal, causes the controlled equipment to take some action. In the embodiment shown, the microprocessor 23 is configured to activate or deactivate an alternating current (AC) relay 25 that is positioned along a controlled equipment's power supply 24. The microprocessor 23 activates or deactivates the AC relay 25 by providing an electronic signal along wire 28.

Figure 3:
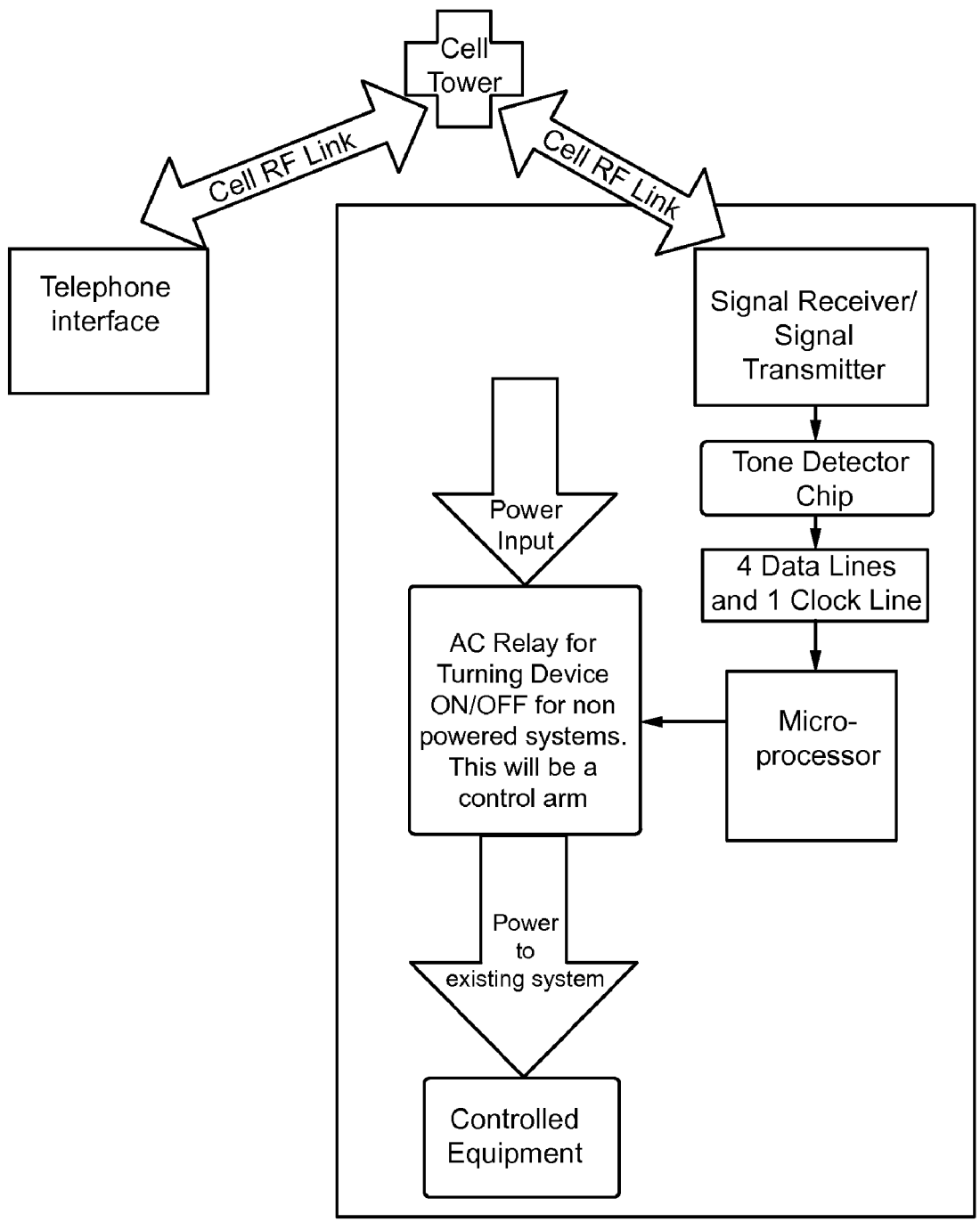
FIG. 3 provides a flow chart of one embodiment of operation of the remote equipment management system.

FIG. 3 provides a flow chart of one embodiment of operation of the remote equipment management system. A telephone interface communicates with a signal receiver via a cellular radio frequency link ("Cell RF Link") and cell tower. The communication signals sent from the telephone interface are received by the signal receiver. The control system may further comprise a signal transmitter which may provide return signals to the telephone interface. The signals received from the signal receiver are sent to a tone detector chip, which detects and processes tones received from the telephone interface. The processed tones are sent, as a signal, via 4 data lines and a clock line to a microprocessor. This connection to the microprocessor allows the microprocessor to interpret the signal and signal order from the tone detector chip. The microprocessor then processes the signals it has received. If the received signal is a correct input, the microprocessor provides an output signal to activate or deactivate an AC relay positioned along the power input of the controlled equipment. In this configuration, the telephone interface may be used to control the power of an item of controlled equipment.

Figure 4:
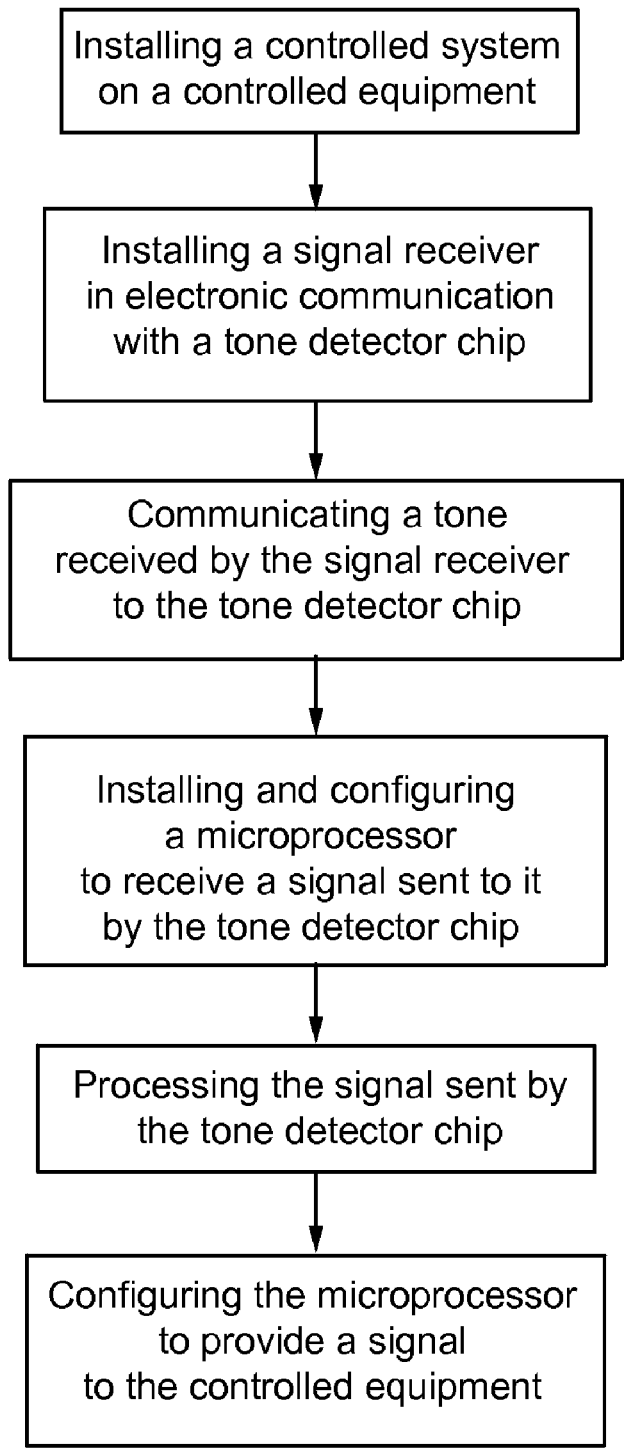
FIG. 4 provides a flow chart showing an embodiment of a process of remote equipment control.

FIG. 4 provides a flow chart showing an embodiment of a process of remote equipment control. This process involves the steps of installing a control system on an item of controlled equipment. Within the installed control system, a signal receiver and a tone detector chip are installed. The signal receiver and tone detector chip being in electronic communication with each other, and capable of communicating a tone received by the signal receiver to the tone detector chip. A microprocessor is installed within the control system and configured to receive a signal communicated to it by the tone detector chip. The microprocessor then processes this signal, and is configured to provide a signal to the controlled equipment, triggering some action on the part of the controlled equipment if the signal provided to the microprocessor is a proper signal to trigger action.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A remote equipment management apparatus comprising:
   a control system positioned between a power input and a power to a controlled equipment, the control system being connected to the power input, the power input providing the power to the controlled equipment, the control system comprising a signal receiver, a tone detector chip, a microprocessor, and a relay all being enclosed in a case; wherein the signal receiver is configured to receive a signal from a computerized telephone interface, the computerized telephone interface configured to automatically communicate the signal to the signal receiver the signal provided by the telephone interface being a plurality of unique input codes in the form of a plurality of tone inputs, the signal receiver being in electronic communication with the tone detector chip, the signal receiver communicating the plurality of tone inputs to the tone detector chip;
   wherein the tone detector chip is in electronic communication with the microprocessor, the tone detector chip communicating an input signal to the microprocessor based on the plurality of tone inputs provided by the tone detector chip; wherein the microprocessor is constructed and configured to process the input signal received from the tone detector chip to provide an output signal, the output signal provided by the microprocessor being capable of deactivating the controlled equipment by causing the relay to disconnect the power input from the power to the controlled equipment; a computer configured to identify an overdue bill for the controlled equipment and capable of deactivating the controlled equipment using the computerized telephone interface to send a signal to the signal receiver to deactivate the controlled equipment; and
   wherein the controlled equipment is an item of office equipment.

2. The remote equipment control system of claim 1 wherein the signal receiver is configured to receive a wireless signal from the telephone interface.

3. The remote equipment control system of claim 1 wherein the controlled equipment is a copy machine.

4. The remote equipment control system of claim 1 wherein the signal receiver is a mobile cellular device.

5. The remote equipment control system of claim 4 wherein the control system further comprises a signal transmitter, the signal transmitter capable of providing a return signal to the telephone.

6. The remote equipment control system of claim 4 further comprising a computer, the computer configured and arranged to automatically utilize the telephone interface to communicate with the control system.

7. The remote equipment control system of claim 1 wherein the relay is an alternating current relay.

8. A method of remote equipment control comprising the steps of:
   installing a control system on an item of controlled equipment, the control system being installed between a power input and a power to a controlled equipment the controlled equipment being an item of office equipment, the control system comprising a signal receiver, tone detector chip, microprocessor, and a relay, all being enclosed in a case; configuring a tone detector chip of the control system to process a touch tone provided by a telephone interface in wireless communication with the control system; configuring the signal receiver to wirelessly receive the touch tone from the telephone interface; communicating the tone input received by the signal receiver to the tone detector chip; processing the tone input received by the tone detector chip to provide a signal output; communicating the signal output to the microprocessor of the control system; configuring the microprocessor to receive the signal sent to it by the tone detector chip; processing, by the microprocessor, the signal sent by the tone detector chip; and providing an output by the microprocessor, the output deactivating the controlled equipment if the signal sent by the tone detector chip is a proper deactivating signal, the deactivating of the controlled equipment being performed by the relay; utilizing a computerized telephone interface to automatically communicate a tone to the signal receiver of the control system; utilizing a computer to identify an overdue bill for the controlled equipment; and deactivating the controlled equipment using the computer and computerized telephone interface, wherein the touch tone communicated by the computerized telephone interface to the signal receiver of the control system results in deactivating the controlled equipment.

9. The method of remote equipment control of claim 8 wherein the controlled equipment is a copy machine.

* * * * *